United States Patent [19]
Radermacher et al.

[11] Patent Number: 5,706,785
[45] Date of Patent: Jan. 13, 1998

[54] FUEL SUPPLY SYSTEM FOR INTERNAL COMBUSTION ENGINES

[75] Inventors: Bernhard Radermacher, Viersen; Henning Garcke, Willich; Heinz Beier, Meerbusch, all of Germany

[73] Assignee: Pierburg AG, Neuss, Germany

[21] Appl. No.: 621,224

[22] Filed: Mar. 25, 1996

[30] Foreign Application Priority Data

Mar. 23, 1995 [DE] Germany .................. 195 10 497.8

[51] Int. Cl.$^6$ .................................................. F02M 41/00
[52] U.S. Cl. .................. 123/457; 123/514; 123/511; 137/115.13
[58] Field of Search ................... 123/509, 514, 123/510–11, 457; 137/115.13, 115.24, 115.26, 115.27

[56] References Cited

U.S. PATENT DOCUMENTS

| | | | |
|---|---|---|---|
| 4,258,681 | 3/1981 | Gruden et al. | 123/511 |
| 5,285,759 | 2/1994 | Terada et al. | 123/514 |
| 5,289,810 | 3/1994 | Bauer et al. | 123/510 |
| 5,373,829 | 12/1994 | Schuers et al. | 123/510 |
| 5,377,645 | 1/1995 | Moore | 123/514 |
| 5,398,655 | 3/1995 | Tuckey | 123/456 |
| 5,425,342 | 6/1995 | Ariga et al. | 123/514 |
| 5,529,035 | 6/1996 | Hunt et al. | 123/524 |

FOREIGN PATENT DOCUMENTS

| | | |
|---|---|---|
| 3102983 | 4/1982 | Germany . |
| 4332446 | 3/1994 | Germany . |

*Primary Examiner*—Thomas N. Moulis
*Attorney, Agent, or Firm*—Ladas & Parry

[57] ABSTRACT

A fuel supply system for an internal combustion engine in which a fuel pump pumps fuel from a fuel tank to a fuel distributor and a pressure regulator is connected between the fuel pump and the fuel distributor to respond to pressure of the fuel pumped by the fuel pump, to return fuel back to the fuel tank as a function of the pressure of the pumped fuel, a pressure reducer being disposed between the pressure regulator and the fuel distributor to reduce the pressure of the fuel delivered to the fuel distributor to a value lower than the pressure of the fuel at the pressure regulator.

10 Claims, 3 Drawing Sheets

5,706,785

FUEL SUPPLY SYSTEM FOR INTERNAL COMBUSTION ENGINES

FIELD OF THE INVENTION

The invention relates to a method and apparatus for pumping fuel from a fuel tank to a fuel distributor of an internal combustion engine and more particularly to the pumping of fuel via a pressure regulator which returns excess pumped fuel back to the fuel tank.

BACKGROUND AND PRIOR ART

In conventional systems provided with a fuel pump and a pressure regulator, the pressure regulator is arranged downstream of the fuel distributor and excess fuel flows back into the fuel tank.

Fuel pumps of large capacity operate in this way against a controlled fuel pressure. During prolonged operation of the internal combustion engine under partial load or when the fuel tank is close to empty, fuel heated by the hot engine is transported back into the tank as a significant component, whereby increased vapor pressure and gas bubbles may be formed in the fuel aspirated by the pump.

DE 43 32 446 discloses a pressure switch inserted between the fuel pump and the fuel distributor for switching between on-off states as a function of the pump outlet pressure. In this way the fuel pump is supplied with a variable electrical power by means of a control circuit, if the pump outlet pressure goes above or below threshold values of the pressure switch.

In this device, no fuel return to the fuel tank is provided. However, a large fluctuation of the pump outlet pressure is obtained due to the required switching operation.

DE 31 02 983 discloses a device for control of fuel input to an internal combustion engine, in which a pressure regulator adjusts a switch resistance by the quantity of fuel that flows back to the tank which is a function of the power input of the fuel pump. Even in this device, however, an increase of fuel temperature occurs in the fuel tank and a large pump pressure fluctuation is produced due to pressure variation of the switch.

SUMMARY OF THE INVENTION

An object of the invention is to provide a fuel supply system and method which minimizes pressure fluctuations of the fuel delivered to the fuel distributor of the engine.

A further object of the invention is to provide a fuel supply system and method which substantially eliminates heating of the fuel by the engine.

Another object of the invention is to provide a fuel supply system and method having an overall reduced power input.

The above and further objects of the invention are achieved by pumping fuel by a fuel pump from a fuel tank to a fuel distributor of the engine via a pressure regulator and a pressure reducer, wherein the pressure regulator responds to the pressure of the fuel and controls return of fuel back to the fuel tank, while the pressure reducer reduces the pressure of the fuel delivered to the engine to a value which is lower than the pressure of the fuel at the pressure regulator.

According to a feature of the invention, the pressure regulator includes a variable volume chamber receiving the pumped fuel and a valve controls backflow of the fuel to the fuel tank as a function of the volume of said chamber and thus of the pressure of the pumped fuel.

According to a further feature of the invention, said valve opens and closes in response to a large change in volume of said chamber whereby to provide a large switching hysteresis, said valve being open when said volume of the chamber is large and being closed when said volume is small.

DETAILED DESCRIPTION OF PREFERRED EMBODIMENTS OF THE INVENTION

Figure 1:
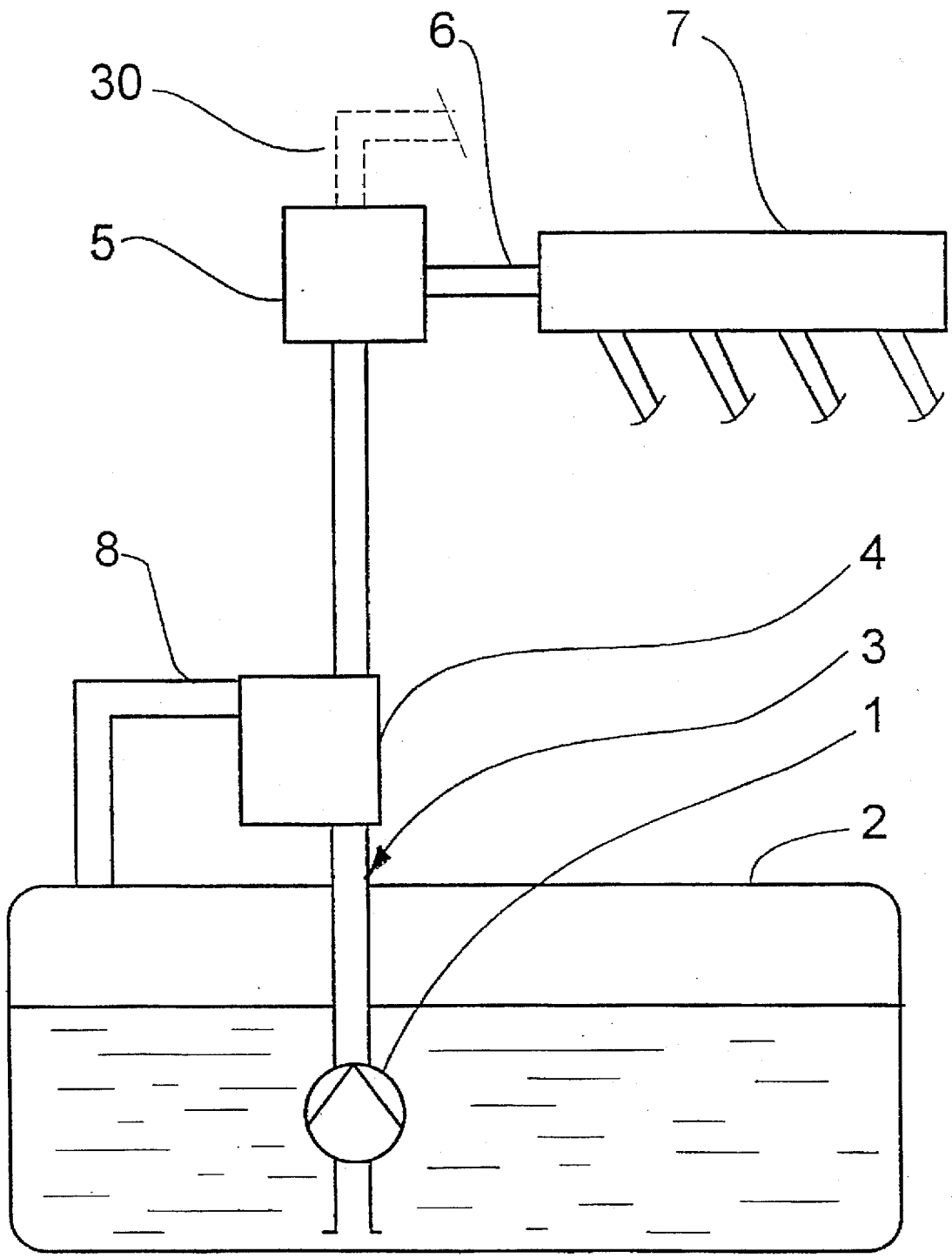
FIG. 1 is a diagrammatic illustration of a fuel supply system according to the invention.

FIG. 1 schematically illustrates a fuel supply system according to the invention for supplying fuel to an internal combustion engine (not shown) and wherein the fuel supply system comprises a fuel pump 1 disposed in a fuel tank 2 for pumping fuel to a fuel line 3 leading to the internal combustion engine. Included in the fuel line 3 is a pressure regulator 4 and a pressure reducer 5. An output portion 6 of fuel line 3 connects the output of pressure reducer 5 to a fuel distributor 7 of the internal combustion engine. In this embodiment, the fuel distributor 7 is connected to fuel injectors (not shown) of the internal combustion engine.

A fuel return line 8 connects pressure regulator 4 to fuel tank 2 to return excess fuel not required by the engine back to the fuel tank. The pressure reducer 5 is adjusted so that the pressure of the fuel supplied to the engine is reduced to a value which is less than the delivery pressure of the fuel coming from the pressure regulator 4.

By reducing the pressure of the fuel in the pressure reducer 5, it is assured that pressure fluctuations in the fuel line 3 coming from the pressure regulator 4 do not enter the fuel distributor 7. The pressure reducer 5 can be of any conventional design as is well known to those skilled in the art. Suitable examples of pressure reducers are shown in U.S. Pat. Nos. 4,258,681 and 5,398,655.

Pressure regulator 4 has a relatively large volume for storage of fuel in a fuel chamber 19 to be described more fully later, which provides a large adjustment range for a pressure control valve 9 of the pressure regulator 4. The control valve 9 provides a large backflow of fuel to the fuel tank when large volumes of fuel are stored in fuel chamber 9, and little or no backflow when small volumes of fuel are stored in chamber 19.

More particularly, the pressure control valve 9 is constructed as an on-off valve and the pressure regulator 4 operates with a large switching interval or switch hysteresis between its on-off positions. Namely, in the case of large fuel volumes in chamber 19, the pressure control valve 9 is open, and in the case of small fuel volumes in chamber 19, the valve 9 is closed. The valve 9 goes from open to closed state after a relatively large change of volume of chamber 19.

Figure 2:
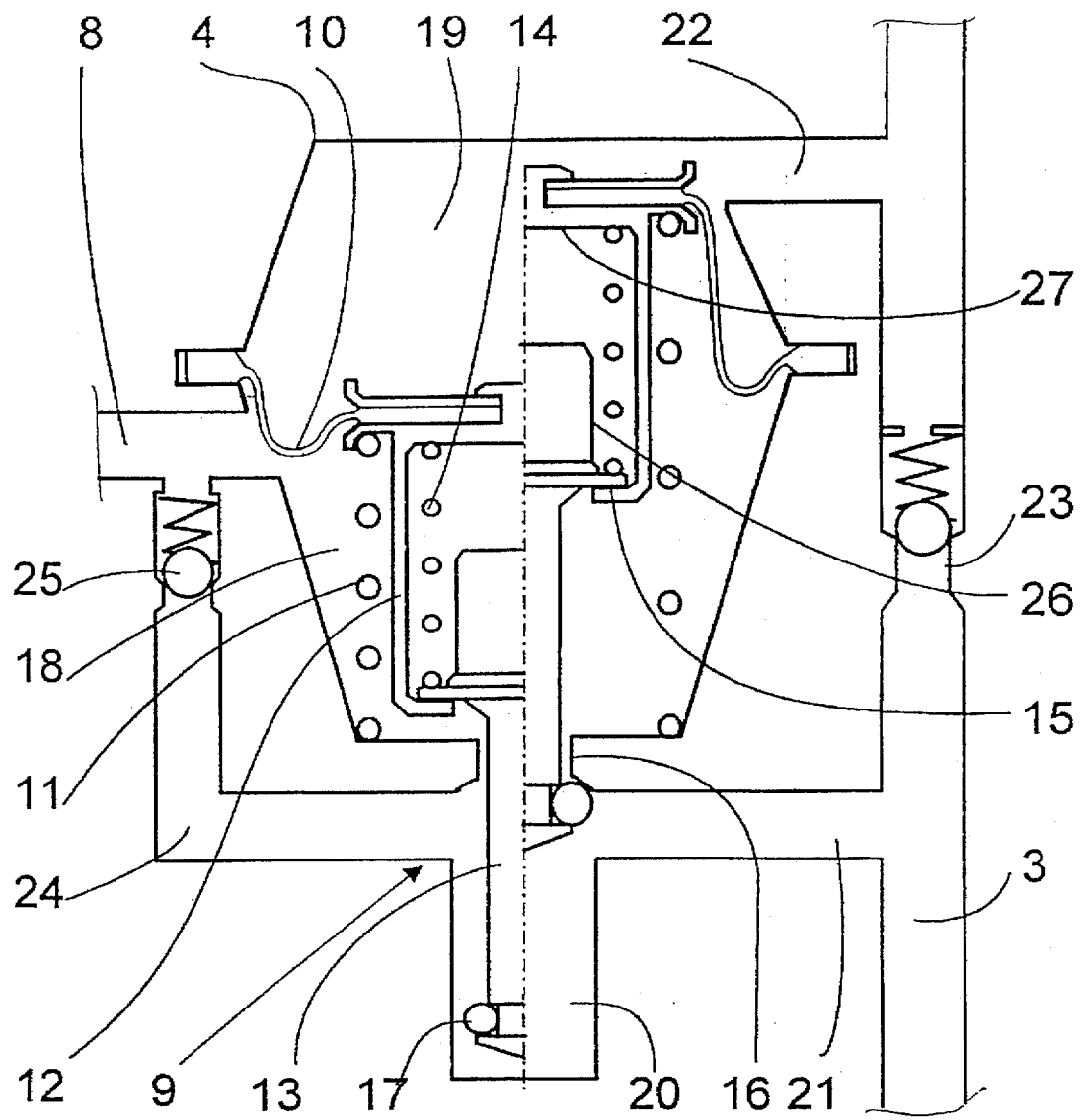
FIG. 2 is an enlarged, diagrammatic, sectional view of a portion of one embodiment of a pressure regulator in the system of FIG. 1.

Referring specifically to FIG. 2, pressure regulator 4 has a membrane 10 bounding the fuel storage chamber 19, and the membrane is biassed by a spring 11 to oppose increase in volume of chamber 19. A membrane holder is fixed to membrane 10 to travel therewith and the holder includes a depending sleeve 12 which engages a valve lifter 13 through the intermediary of a collar 15 fixed to lifter 13 and biassed against sleeve 12 by a spring 14. Valve lifter 13 projects through a valve opening 16 and carries a valve closure element 17 in the form of an O-ring, at its lower end. A lower chamber 18 is formed between valve opening 16 and membrane 10 and chamber 16 is connected to the fuel tank 2 by return line 8. Accordingly, ambient pressure prevails in chamber 18.

A valve chamber 20 below the opening 16 is connected by a branch line 21 to the fuel line 3. The storage chamber 19 is connected by a branch line 22 to fuel line 3. A one-way check valve 23 is located in fuel line 3 between branch line 21 and branch line 22 and prevents backflow of fuel from the storage chamber 19 to the fuel tank 2.

A bypass channel 24, whose function will be described later is connected to valve opening 16, and contains a one-way check valve 25. When operation is begun with an empty storage chamber 19 and a closed pressure regulator valve 9, fuel pump 1 conveys fuel through check valve 23 into storage chamber 19 and to pressure reducer 5. By adjustment of membrane 10 against the force of spring 11, a higher pressure prevails in fuel pressure line 3 than the pressure controlled by pressure reducer 5, and thus fuel at the operating pressure appears at distributor 7.

The pressurized fuel arriving via branch line 21 into valve chamber 20 reaches closed pressure control valve 9 and applies pressure against the valve closure element 17 in opposition to the ambient pressure prevailing in chamber 18 to maintain the lifter 13 in the closed position until the tension in spring 14 increases, as the sleeve 12 is lowered with the membrane 10, to a value which exceeds the closing force of the valve 9 or until a lower surface 27 of the membrane holder contacts a snubber 26 on the collar 25. Thereupon, pressure control valve 9 is opened by the pressure acting on the membrane 10 and as soon as the valve 9 opens, the valve lifter 13 is instantly urged downwards until collar 15 contacts sleeve 12. This arrangement provides a lost motion operation in which the valve 9 remains closed until the volume of chamber 19 has increased to a predetermined large amount.

In this condition, the fuel in line 3 upstream of check valve 23 is pressurized at the ambient pressure prevailing in membrane chamber 18 and check valve 23 closes. Fuel pump 1 pumps the fuel only against ambient pressure with reduced power consumption.

Downstream of check valve 23, the pressure due to the fuel storage volume is maintained in storage chamber 19 until valve lifter 13, moving together with sleeve 12, closes pressure regulator valve 9, and the process is repeated. Due to check valve 25 in bypass channel 24, the closing force acting on valve closure element 17 can be limited.

Figure 3:
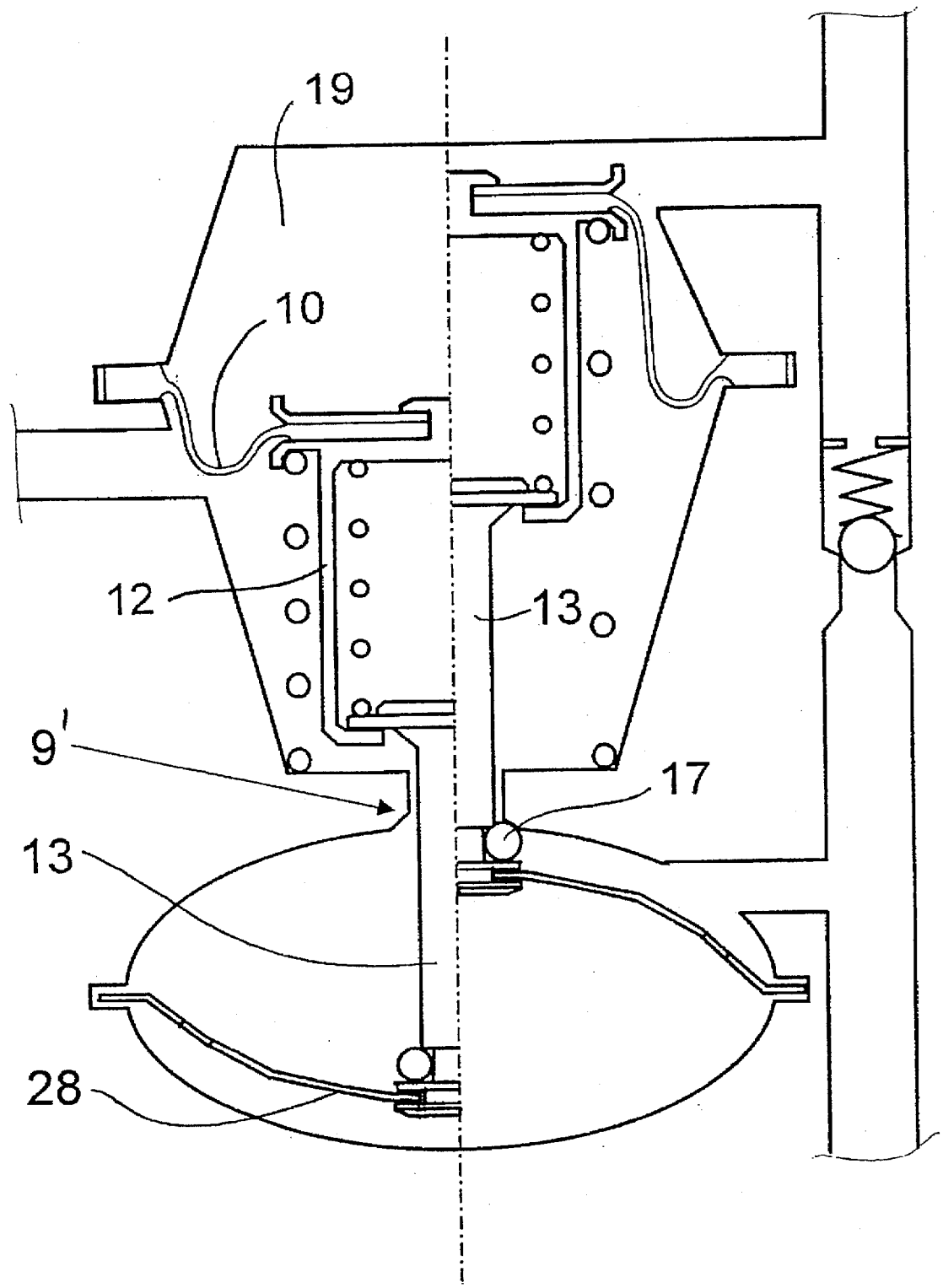
FIG. 3 is similar to FIG. 2 and shows another embodiment of the pressure regulator.

FIG. 3 shows an alternative embodiment of the pressure control valve, herein designated 9', in which the same reference numerals are used to designate the same elements as in FIG. 2. The valve lifter 13 is connected to a leaf spring 28, which applies a biassing force on the valve closure element 17 to close the pressure regulator valve 9'.

Figure 4:
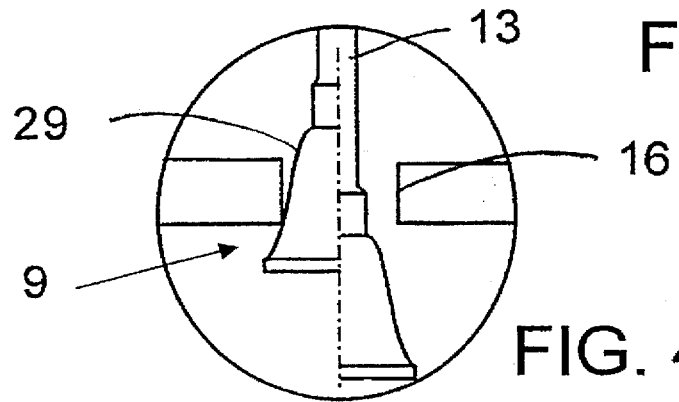
FIG. 4 shows a detail of a modification of the embodiments of the pressure regulators.

FIG. 4 shows a modification in which the pressure control valve is designed as a proportioning valve instead of as an on-off valve. For this purpose, instead of the O-ring 17, the closure element is formed as a valve body 29 having a tapered outer configuration. Thereby, the quantity of fuel flowing back to the fuel tank is proportional to the increasing fuel storage volume in chamber 19 as the valve is progressively opened.

The pressure reducer 5 can be supplied with the air inlet pressure of the internal combustion engine via a line 30 shown in dotted outline in FIG. 1.

Although the invention has been described in relation to specific embodiments thereof, numerous modifications and variations can be made within the scope and spirit of the invention. Thus, for example, the membrane 10 can be replaced by other suitable displaceable members, such as a piston.

What is claimed is:

1. A fuel supply system for an internal combustion engine comprising:

a fuel pump for pumping fuel from a fuel tank to a fuel distributor;

a pressure regulator connected between the fuel pump and the fuel distributor to respond to pressure of the fuel pumped by the fuel pump, to return fuel back to said fuel tank as a function of the pressure of the pumped fuel, a pressure reducer between the pressure regulator and the fuel distributor to reduce the pressure of the fuel delivered to the fuel distributor to a value lower than the pressure of the fuel at the pressure regulator, a fuel line connecting said fuel pump to said fuel distributor via said pressure regulator and said pressure reducer, and a branch line connecting said fuel line to a return line to said fuel tank via said pressure regulator, said pressure regulator including a variable volume storage chamber for receiving fuel pumped by said fuel pump, a displaceable member defining separated first and second chambers of variable volume, one of said chambers being said storage chamber and being connected to the fuel line to receive the fuel pumped by the fuel pump and the other of said chambers being connected to said return line, and a regulator valve responsive to change of volume of said storage chamber, said regulator valve including a valve closure member selectively connecting said other of the chambers with said branch line, said valve closure member being operatively coupled to said displaceable member by a lost motion connection, said regulator valve being in open state when the volume of the storage chamber is relatively large and in closed state when the volume of the storage chamber is relatively small, said open and closed states of said regulator valve corresponding to a relatively large change in volume of said storage chamber, said regulator valve remaining in closed state as said storage chamber undergoes change in volume between said relatively small volume and said relatively large volume.

2. A fuel supply system as claimed in claim 1, wherein said lost motion connection comprises, a valve lifter carrying said valve closure member, and means operatively coupling said displaceable member and said valve lifter to permit displacement of said displaceable member while said valve closure member closes said regulator valve.

3. A fuel supply system as claimed in claim 2, wherein said displaceable member comprises a membrane bounding said storage chamber.

4. A fuel supply system as claimed in claim 2, wherein with said regulator valve in said closed state, said storage chamber is subject to the pressure of the fuel in the fuel line and said other chamber is at ambient pressure and in said open state said fuel line is connected to said other chamber so that the fuel pump pumps fuel back to the tank against the ambient pressure.

5. A fuel supply system as claimed in claim 4, further comprising a spring acting to bias said valve closure element to a position in which said regulator valve is in said closed state.

6. A fuel supply system as claimed in claim 4, wherein said valve closure member has a configuration of a proportioning valve.

7. A fuel supply system as claimed in claim 1, comprising a line connected to said pressure reducer to supply thereto pressure of the fuel at an inlet to the internal combustion engine.

8. A fuel supply system as claimed in claim 1, comprising a check valve in said fuel line between an inlet to said storage chamber and said branch line.

9. A fuel supply system as claimed in claim 8, comprising a further check valve in a line connecting said branch line to said return line.

10. A fuel supply system as claimed in claim 1, wherein said lost motion connection comprises a biasing spring acting on said displaceable member to oppose increase in volume of said storage chamber, a valve lifter supporting said valve closure member, and a further spring between said valve lifter and said displaceable member.

* * * * *